United States Patent [19]

Graham

[11] Patent Number: 4,735,389
[45] Date of Patent: Apr. 5, 1988

[54] PORTABLE CAMERA AND INSTRUMENT SUPPORT AND POSITIONING SYSTEM

[76] Inventor: Philip F. Graham, 928 Clarke Road, P.O. Box 17, Brentwood Bay, British Columbia, Canada, V0S 1A0

[21] Appl. No.: 934,999

[22] Filed: Nov. 26, 1986

[51] Int. Cl.$^4$ ............................................... F16M 11/00
[52] U.S. Cl. ..................................... 248/176; 248/183; 248/316.6; 354/293
[58] Field of Search ............ 248/176, 187, 183, 316.6, 248/313; 354/81, 82, 293, 294, 113; 352/243

[56] References Cited

U.S. PATENT DOCUMENTS

| | | | |
|---|---|---|---|
| 2,483,711 | 10/1949 | Roos | 354/293 |
| 2,614,471 | 10/1952 | Markowitz | 354/293 |
| 3,317,169 | 5/1967 | Hendricks | 248/188.2 |
| 3,545,710 | 12/1970 | Mooney | 248/183 |
| 3,608,462 | 9/1971 | Groshone | 354/293 X |
| 4,241,988 | 12/1980 | Lepp | 248/183 X |
| 4,283,135 | 8/1981 | Lupis | 354/293 |
| 4,318,605 | 3/1982 | Perisic | 352/89 X |
| 4,569,579 | 2/1986 | Kangas | 354/293 |
| 4,582,410 | 4/1986 | Niwaya et al. | 354/293 |
| 4,632,352 | 12/1986 | Stoll | 248/316.6 X |

*Primary Examiner*—Ramon O. Ramirez
*Attorney, Agent, or Firm*—Fetherstonhaugh & Co.

[57] ABSTRACT

A modular support system is provided herein. It includes one, but preferably at least two, elongated bars, each having a longitudinally extending slot traversing substantially the entire length thereof except at the ends thereof. A clamping member is provided for engagement with the elongated bar and preferably for use when at least two elongated bars are used, for clamping two such elongated bars together at any desired angle, e.g. at 180° to each other. The clamping member comprises a pair of complementary, essentially U-shaped members, with the space between the arms of the "U" being substantially the same as the width of the elongated bar, a central longitudinal ridge between the arms of the "U", adapted to enter the slot in the elongated bar, and preferably also a pair of pins mounted, preferably removably, on at least one ridge and adapted to enter cooperating aperture e.g. in the flat base of the "U", and means for providing secure, e.g., threaded, engagement of the two U-shaped members through the ridges thereof. An annular member, which is provided with at least one longitudinally extending slot in an arm thereof, is used for detachable securement at any desired location to an elongated bar. This provides a useful, simple, versatile, support system for a camera, for lights or for other equipment.

29 Claims, 4 Drawing Sheets

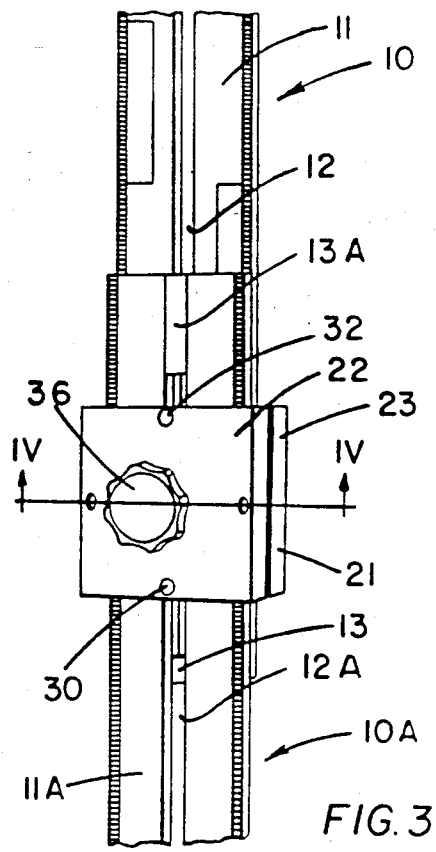
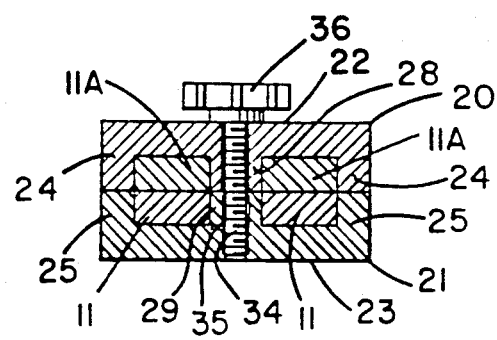
FIG. 3
FIG. 4

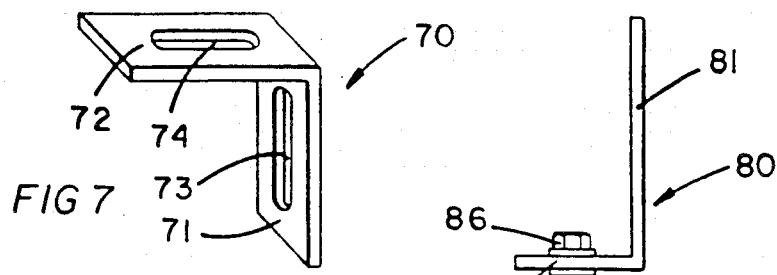
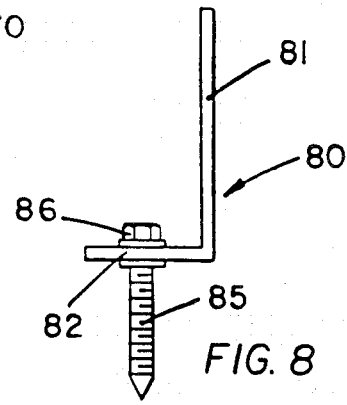
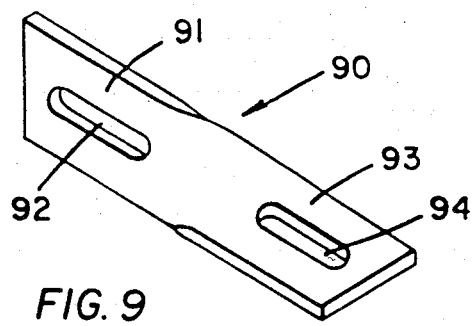
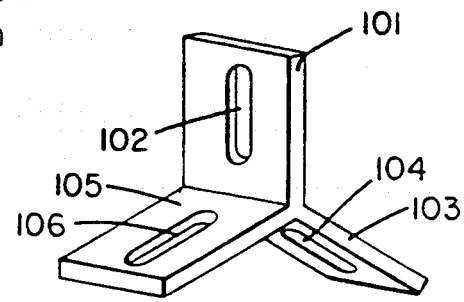
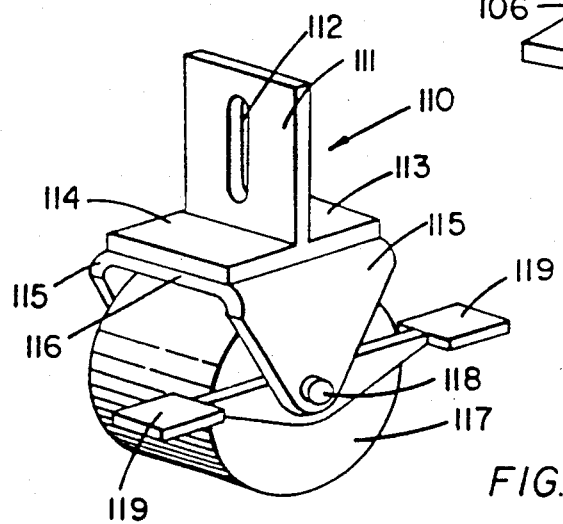

PORTABLE CAMERA AND INSTRUMENT SUPPORT AND POSITIONING SYSTEM

BACKGROUND OF THE INVENTION

1. (i) Field of the Invention

This invention relates to a portable camera or other instrument support and positioning system.

2. (ii) Description of the Prior Art

One of the most common such camera support systems is a tripod. In conventional tripods for cameras, a base plate is provided to which the camera is attached and two or three metallic pipes or tubes each having a smaller diameter are telescopically arranged or disposed within one another to permit the height of the tripod to be adjusted. The fixing of the telescoping leg segments in a desired position is conventionally done with collars located on the end of each of the inner leg positions so that upon rotation of a collar in one direction, the interfitting tubular leg is squeezed and held in position. However, the rotary motion is time consuming and renders difficult the accurate adjustment of the legs.

To overcome this disadvantage, a tripod having a leg clamping element, e.g., a snap lever, has been suggested, but this arrangement requires another element for fixing the snap lever in position. As a result, the element increased the overall size of the leg grasping mechanism which rendered the tripod inconvenient to transport easily as the overall collapsed size of the tripod was undesirably increased.

To overcome the foregoing drawback in the conventional tripod, the invention in U.S. Pat. No. 4,174,900 patented Nov. 20, 1979 by Ina provides a tripod wherein the snap levers were located inside of U-shaped legs and were constructed so as to reduce the amount of force required to actuate the snap levers while decreasing the size of the collapsed length of the tripod. As a result, the overall compactness of the resulting tripod was said to be improved.

Another such support is the photographic lighting system in U.S. Pat. No. 3,952,322 of Wolfe patented Apr. 20, 1976. In that patent the structure for positioning lights was provided in the combination of vertical and horizontal supports and releasable means for folding the vertical and horizontal supports in various assembled parallelepiped relations, so that the supports could be quickly and adjustably assembled to enclose a relatively small object to be photographed in a fixed support lighting means on the structure in fixed locations. The disadvantage of such system was that it was not portable and could only be used to enable photographing objects located within its ambit.

Another camera support is that provided in U.S. Pat. No. 3,317,169 patented May 2, 1967 by Hendricks. In that patent, an anchor was described for a camera. The anchor included a mounting means on the camera and a coiled-up elongated member, which was adjustable in length secured at one end of the mounting means. The other end of the elongated member had an anchoring means to be anchored against an anchoring object. While this device had the advantage of portability, it suffered the disadvantage of not being able to support the camera against downward movement.

Yet another such camera support is that provided in U.S. Pat. No. 4,318,605 patented Mar. 9, 1982 by Perisic. In that stand for photographic apparatus, provision was specially made for providing apparent relative movement in depth between a subject and a background by projecting the background onto a reflective surface, placing a subject to which movement is to be imparted in the optical path between the background and a camera, and synchronising the size of picture seen by the camera with size conditions imparted to the background. During an actual or apparent increase or decrease in size of the imparted background, the camera lens was synchronized to make a corresponding adjustment so that no apparent alteration in the background was seen by the camera lens whereas the subject which was only affected by the adjustment of the camera, appeared to move relative in depth to the background.

The arrangement for the camera and projector was one in which, in order to enhance the realism, synchronised panning and tilting was also provided and because, the projection was front projection, the camera and projector were mounted on the same stand. The stand provided in that U.S. Pat. No. 4,318,605 comprised means for supporting the photographic apparatus for movement about three transverse axes, the axes intersecting one another substantially at a common point. Preferably the axes were orthogonal to one another. Preferably, the means for supporting the photographic apparatus comprised a support mounted on a main frame rotatable about a first vertical axis, the support being mounted on the frame for rotation about a second horizontal axis, and part of the support being rotatable relative to its mountings about a third axis. The support could be a circular support mounted in bearings between spaced arms of the main frame, the first axis containing the center of the circle, the second axis being diametric and containing the center of the circle, and the third axis being through the center of the circle, and the ring of the support being rotatable relative to an outer ring. The disadvantage of such stand was that it was not truly portable and could not be used in various environments.

Other such camera supports are the hand held type used to support a camera and a light bar. In U.S. Pat. No. 2,614,471 patented Oct. 21, 1952 by Markowitz, the means to mount the camera included a horizontal slit at the bottom of the recess. A boss extended from the horizontal arm and was slidably received in the recess in order to mount the camera to the horizontal arm. While this provided adjustability of the camera with respect to the arm and the lamp support device, it did not provide any means to fix the supported camera in any spatial orientation.

Another such camera support was provided by U.S. Pat. No. 3,550,519 patented by Leurs. In that patent, a lamp was located on an angle bracket which could tilt down with reference to a horizontal bracket. A second angle bracket supported a camera perpendicular to the horizontal bracket. A pivot between the lamp support and the camera support permitted rotating the camera to either the horizontal or vertical position. This support was deficient in that the relative adjustment were made by means of finite, pre-aligned aperatures. In addition the support did not provide any means to fix the supported camera in any spatial orientation.

Another such camera support is that provided in U.S. Pat. No. 4,283,135 patented Aug. 11, 1981 by Lupis. In that close-up photography aid, the accessory included a base frame made up of several arms, each having longitudinal slots therein, the arms being pivoted together. A camera was mounted on one arm, while a photographic subject, along with a background panel and co-light equipment were supported adjustably along any other of the arms by cooperation with the slots. Again while infinite adjustment along the arms was possible, the support did not provide any means to fix the supported camera in any spatial orientation.

Still another such camera support was that provided in U.S. Pat. No. 4,241,988 patented Dec. 30, 1980 by Lepp. In that bracket for supporting electronic flash units in a desirable position relative to a camera, it was known that there were many known arrangements for coordinating and/or synchronizing electronic flash units with the shutter of a camera. In the patented device, a bracket for supporting a camera and, as well, electronic flash units, was one in which flash units were supported to close proximity to the camera and to the subject. The bracket included a camera-supporting rod and a pair of electronic flash supporting rods. The flash-supporting rods were joined to the camera-supporting rod by appropriate clamps which were controlled by clamp arrangements, such that positioning of the respective rods was easily achieved. Various camera mounting and positioning elements were also provided. Again with this patented device, there was no provision to fix the supported camera in any spatial orientation.

SUMMARY OF THE INVENTION (i) Aims of the Invention

It is therefore a broad object of this invention to provide a camera support in which the camera can be mounted at any desired location, associated with means to fix the so-supported camera in any spatial orientation.

Another object of this invention is the provision of such a camera support which is of modular construction permitting easy assembly into different configurations from a small complement of components supplied in appropriate quantities.

Yet another object of this invention is the provision of such a camera support in which the camera may be secured at any selected position thereon, which can be defined by the geometry of the assembled configurations.

(ii) Statement of Invention

This invention provides a modular support comprising (a) an elongated bar having a longitudinally extending slot traversing substantially the entire length thereof, except at its ends; (b) a clamping member securable to the elongated bar, the clamping member comprising a pair of complementary, essentially U-shaped components, with the space between the arms of the "U" being substantially the same as the width of the elongated bar, a central ridge between the arms of the "U" and adapted to enter the slot in the elongated bar, and means for providing secure engagement of the two "U"-shaped members through the ridge thereof; and (c) an angular member provided with at least one longitudinally extending slot in an arm thereof, for detachable securement at any desired location of the elongated bar; whereby a camera may be supported thereby and extended into its desired position.

In addition, this invention provides a modular support comprising (a) at least two elongated bars, each having a longitudinally-extending slot traversing substantially the entire length thereof except at its ends; (b) a clamping member for clamping two such elongated bars together, either at 180° to each other or at 90° to each other, the clamping member comprising a pair of complementary, essentially U-shaped members, with the space between the arms of the "U" being substantially the same as the width of the elongated bar, a central longitudinal ridge between the arms of the "U", adapted to enter the slot in the elongated bar, a pair of pins secured to the ridge and adapted to enter cooperating aperatures, in the U-shaped clamp, and means for providing secure, e.g., threaded engagement of the two U-shaped membrs through the ridges thereof; and (c) an angular member provided with a longitudinally extending slot in each of the two arms thereof, for detachable securement at any desired location of the interconnected elongated bars.

(iii) Other features of the Invention

By one feature of the present invention, the clamping member includes a pair of pins, at least one being secured to at least one ridge, and cooperating apertures in the clamp for engagement with the pins to prevent relative rotation between the complementary clamping components.

By another feature of the present invention, the pins and the apertures are on or in the ridges.

By another feature of the present invention, only the pins are on the ridges.

By another feature of the present invention, only the apertures are in the ridges.

By yet another feature of the present invention, the secure engagement of the complementary components is by a threaded engagement.

By still another feature of the present invention, the angular member includes at least two arms, and each arm is provided with a longitudinally extending slot therein.

By another feature of the present invention, the threaded engagement means comprises a bolt threaded through the top and ridge of one U-shaped member and provided with a central knob at the outer end thereof, adapted to engage a tapped aperature in the opposite ridge.

By another feature of the present invention, two such elongated bars are secured at about 180° to each other.

By yet another feature of the present invention, two such elongated bars are secured at about 90° to each other.

By yet another feature of the present invention, the modular support includes at least one additional elongated bar secured thereto.

By a still further feature of the present invention, the angular member includes a foot spike attached thereto, thereby to provide anchoring at the base of the support.

By yet another feature of the present invention, the angular member includes a foot pad secured to the base of the support, thereby to provide a self-supporting support.

By still another feature of the present invention, the angular member is a right angled bracket.

By yet another feature of the present invention, the angular member is a member having two arms twisted with respect to each other.

By a further feature of the present invention, the angular member is a member having two arms twisted with respect to each other at about 90° thereto.

By yet another feature of the present invention, the angular member includes three arms disposed at angular orientations thereto.

By still another feature of the present invention, the angular member includes three arms disposed at angular orientations thereto the angular orientation being about 120° between each arm.

By yet anther feature of the present invention, the angular member includes a castor attached thereto, thereby to provide controlled mobility thereto.

By a further feature of the present invention, the angular member includes a castor attached thereto, thereby to provide controlled mobility thereto attached thereto, the castor being in the form of a wheel rotatably mounted on an axle.

By yet another feature of the present invention, the angular member includes a castor attached thereto, thereby to provide controlled mobility thereto attached thereto, the castor being in the form of a cylinder rotatably mounted on an axle.

By still another feature of the present invention, the angular member includes a castor attached thereto, thereby to provide controlled mobility thereto attached thereto, the castor being in the form of a SHEPPARD (TM) castor.

BRIEF DESCRIPTION OF THE DRAWINGS

In the accompanying drawings,

FIG. 3 is a perspective view of two assembled elongated bars, at 180° to each other, forming a component of the modular support of an embodiment of this invention;

FIG. 4 is a section through the line IV—IV of FIG. 3;

FIG. 7 is a perspective view of an angular member forming an ancillary component of the modular support of an embodiment of this invention;

FIG. 8 is a side elevational view of an angular member with a foot spike, forming another ancillary modular support of an embodiment of this invention;

FIG. 9 is a perspective view of another embodiment of an angular member forming another ancillary component of the modular support of an embodiment of this invention;

FIG. 10 is a perspective view of yet another embodiment of an angular member forming yet another ancillary component of the modular support of an embodiment of this invention; and FIG. 11 is a perspective view of a castor forming yet another ancillary component of the modular support of an embodiment of this invention.

Figure 1:
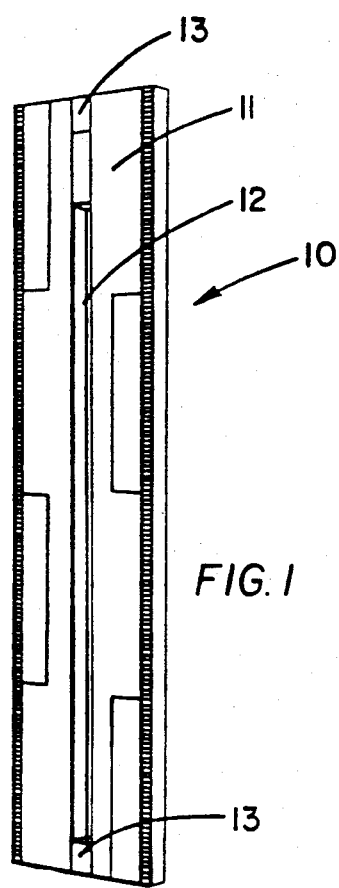
FIG. 1 is a perspective view of an elongated bar forming a component of the modular support of an embodiment of this invention.

DESCRIPTION OF PREFERRED EMBODIMENTS (i) Description of FIG. 1

As seen in FIG. 1, a bar component 10 of the modular support of an embodiment of this invention comprises an elongated bar 11 formed of any suitable and desirable material, having a longitudinally extending slot 12 therein almost to the ends thereof, but provided with end blocks 13 to provide dead ends to the slot 12.

Figure 2:
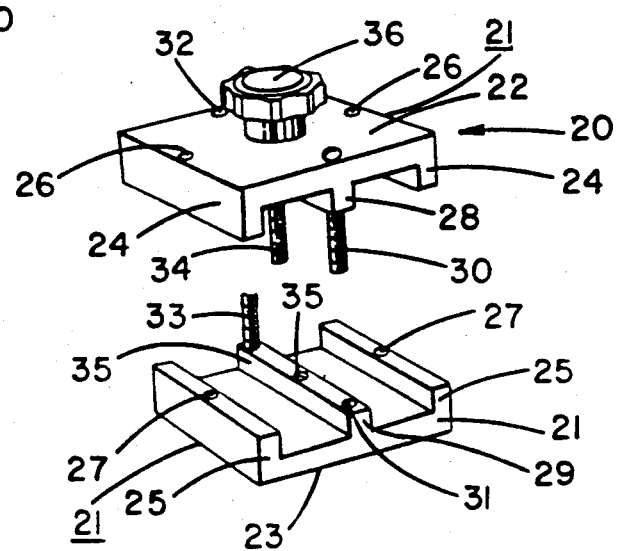
FIG. 2 is a perspective view of a complementary U-shaped clamp forming a component of the modular support of an embodiment of this invention.

(ii) Description of FIG. 2

As seen in FIG. 2, a clamp component module 20 of the modular support of an embodiment of this invention comprises a pair of complementary U-shaped clamps 21. Each clamp includes a flat base 22, 23 and a pair of spaced apart legs 24, 25. Each of such legs is provided with a centrally disposed aperture 26, 27, whose purpose will be described more fully hereinafter. Each clamp also includes a medial ridge 28, 29. Ridge 28 is provided with a projecting pin 30 and an aperture 32 at opposite ends thereof, and ridge 29 is provided with an aperture 31 and pin 33 respectively at opposite ends thereof, in order to mate with pin 30/aperture 32 respectively. However, it is not necessary for the pins to be opposed ridges; both pins may be on ridge 28 and both aperture may be in ridge 29, or vice versa.

In a variant of this clamp module, the pins 30/32 may be dispensed with, in which case any angle may be made between two clamped elongated bars.

Extending through base 22 is a threaded bolt 34 whose longitudinal movement within clamp 21 is controlled by knob 36 to extend through ridge 28 and into ridge 29. Ridge 29 is provided with a mating tapped aperture 35.

(iii) Description of FIGS. 3 and 4

As seen in FIGS. 3 and 4 bar 11 is assembled to bar 11A at 180° to each other by placing bar 11 on clamp 21 with ridge 29 in slot 12. Bar 11A is then placed atop bar 11 with the ridge 28 in slot 12A.

FIGS. 3 and 4 show assembled elongated bars 11 and 11A and U-shaped clamp 21, with the ridge 28, within the slots 12, 12A. The other clamp 22 is placed matingly atop the first clamp 21 with pins 30, 33 engaging aperture 31, 32 respectively and with the ridge 29 within slots 12, 12A. Bolt 34 is then threaded into engagement with tapped aperture 35 by rotation of knob 36 to hold bars 11 and 11A firmly in position.

Figure 5:
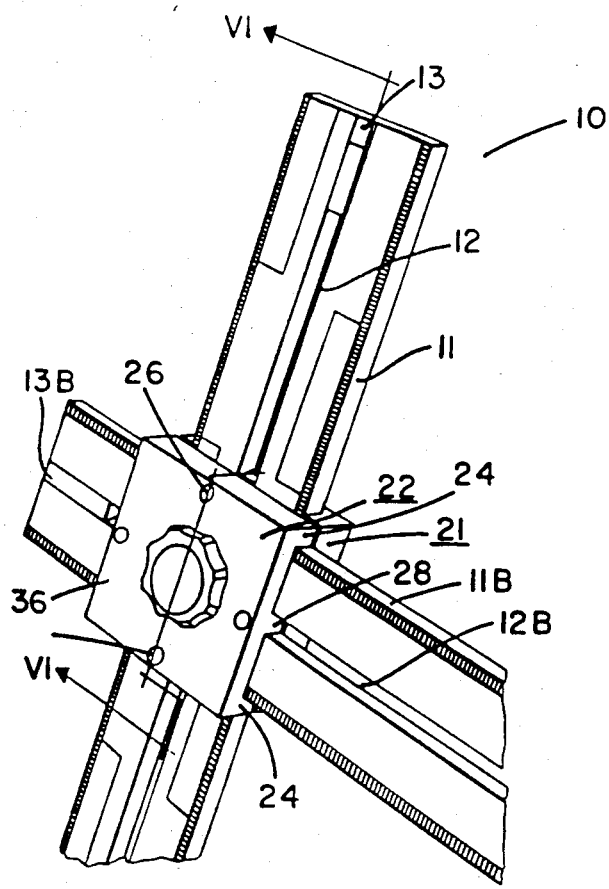
FIG. 5 is a perspective view of two assembled elongated bars at 90° to each other, forming a component of the modular support of an embodiment of this invention.
Figure 6:
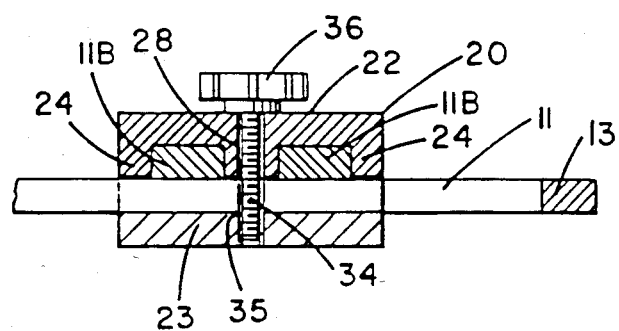
FIG. 6 is a section through the line VI—VI of FIG. 5.

(iv) Description of FIGS. 5 and 6

As seen in FIGS. 5 and 6 bar 11 is assembled in bar 11B at 90° to each other by placing bar 11 on clamp 21 with the ridge 29 in slot 12. Bar 11B is then placed atop bar 11 at 90° thereto with the ridge 29 perpendicular to the slot 12B. The other clamp 22 is then placed matingly on the first clamp 21 with pins 30, 33 engaging aperture 26, 27 respectively, and with the ridge 28 in slot 12B. Bolt 34 is then threaded into engagement with tapped aperture 35 by rotation of knob 36 to hold bars 11 and 11B firmly in position.

To arrange bars 11 and 11B at any angular position to one another, pins 30, 33 are removed, and the bars 11, 11B are held in position solely by friction, by rotation by knob 36 in tapped aperture 35.

(v) Description of FIG. 7

FIG. 7 shows an angular member 70 which is another module of the modular support of an embodiment of this invention. It includes two arms 71, 72 disposed at any selected angle to one another, either acute, right or obtuse, but preferably being a right-angled bracket. Arm 71 is provided with slot 73, while arm 72 is provided with slot 74. Angular member 70 may be secured to bar 10 through slot 73 in arm 71 by means well known in the art, e.g. a wing-bolt and nut, bolt and wing-nut, or knob-bolt and threaded collar or nut. A camera or other instrument may be attached to the other arm through slot 74 in arm 72. Alternatively although not shown, another arm 10 may be secured in like fashion to the other arm 73 of the angular member 70 through slot 74.

(vi) Description of FIG. 8

FIG. 8 shows an angular member 80 which is another module of the modular support of an embodiment of this invention. It is basically the same as angular member 70 with a slot in arm 81 and a slot in arm 82. Preferably (as shown) its arms 81, 82 are at right angles to one another. A foot-spike 85 is secured, as by nut 86 within one slot in arm 82. An arm 10 may be secured, in the manner described above for FIG. 7, to the other arm 81 of the angular member 80 through the slot.

(vii) Description of FIG. 9

FIG. 9 shows an angular member 90 which is yet another variant of an ancillary component of the modular support of an embodiment of this invention. The angular member 90 includes one arm 91 and a second arm 93 twisted with respect to the first arm. As shown arm 93 is twisted with respect to arm 91 by 90° although any other angular orientation is possible. As in the first variant in FIG. 7, arm 91 is provided with longitudinal slot 92, while arm 93 is provided with slot 94. Securement to arms 91, 93 through slots 92, 94 is as described in FIG. 7.

(viii) Description of FIG. 10

FIG. 10 shows an angular member 100 which is still another variant of an ancillary component of the modular support of an embodiment of this invention. The angular member 100 includes three arms 101, 103 and 105 disposed angularly with respect to each other. While as shown, the arms are each 120° with respect to each other, any other angular orientation is possible. As in the first variant in FIG. 7, arm 101 is provided with slot 102, arm 103 is provided with slot 104 and arm 105 is provided with slot 106. Securement of components to arms 101, 103, and 105 through slots 102, 104, and 106 is as described for FIG. 7.

(ix) Description of FIG. 11

FIG. 11 shows a castor 110 which is a still further variant of an ancillary component of the modular support of an embodiment of this invention. It includes an upright arm 111 provided with a longitudinal slot 112, upstanding perpendicularly from a pair base plates 113, 114. Base plates 113, 114 are secured to a plate 116 having spaced apart depending wings 115, between which is mounted a cylindrical roller 117, on pins 118. The castor 110 is provided with a foot brake 119. Alternatively, instead of cylindrical roller 117, the castor supported on base plates 113, 114 may be of the type known as a SHEPPARD (TM) castor. Securement of components to arm 112 through slots 112 is as described for FIG. 7.

OPERATION OF PREFERRED EMBODIMENTS

Using the modular components and ancillary components of embodiments of this invention an almost infinite variety of configurations may be provided, with the camera, and/or instrument and/or light unit being mountable at any point. Among the sample configurations are the following thirty-six:

1. 

2.

-continued

3. 

4. 

5. 

6. 

7. 

8. 

9. 

10. 

11. 

12. 

13. 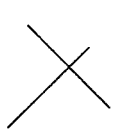

14. 

-continued

15. 

16. 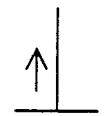

17. 

18. 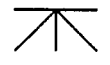

19. 

20. 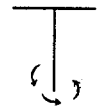

21. 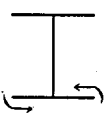

22. 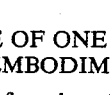

EXAMPLE OF ONE PREFERRED EMBODIMENT

Thus, in one preferred embodiment, the modular support is composed of 1000 mm×60 mm×10 mm flat sections with a center slot having dimensions 900 mm×10 mm and measured units marked upon the full length of each section. The center slot provides continuously variable camera or instrument positioning and the units of measurement supply distance and alignment information. Each section of the system acts as a sliding and locking support, and camera and/or instrument mounting platform connected by clamps, and right angle brackets, using the center slot, to form any geometric assembly required to place the camera and/or instrument in the position desired. Using the center slots one or more cameras and/or instruments may be mounted at any point in the geometry of the system.

Optical axis positions and film plane alignment information may be calculated from a remote point using the measured unit scale marked upon each section of the system.

The modular support system may be used by being hand held by the operator or in a self-supporting mode with foot pads, spikes, castors or clamps to provide controlled mobility or tracking upon a known base line.

The component parts of the modular support system may be constructed of conventional materials e.g. aluminum or, depending upon weight requirements, using high strength, low weight composites, e.g. plastic clad form.

The system may be used upon land or underwater.

FEATURES OF THE INVENTION

Some of the features of the modular support of this invention are:

1. Dimensionally Stable

The materials used in the construction of the modular support remain unaffected by widely varying conditions of heat and humidity. It is further believed that the support may also remain totally immersed in fresh or salt water for long periods without deterioration.

2. Lightweight

Weight is a vital factor which often dictates whether equipment can be taken to a remote site. The limitations of human or animal porterage must be given serious consideration, and the weight factor regulates the performance and range of light aircraft. Therefore, a lightweight modular support has been designed without reducing its strength or restricting its capabilities. Even if the equipment is not required to travel, and is used solely in one location its low weight makes it easier for everyone to handle and use, and sill also encourage more frequent operation.

3. Strong

The principal advantage of modular support lies in the simplicity of its design. The modular support is designed to operate reliably in situations and circumstances where strength is an essential consideration. Fitting sophisticated locking mechanisms or additional moving parts would reduce its reliability in the field. Consistent performance for long periods under arduous conditions can be expected from this modular support.

4. Durable

All sections in the modular support may be manufactured from an advanced form of composite moulding immune to any deterioration when exposed to the elements upon location.

5. Can be Left in Position While Site Work Continues

The simple geometry of this modular support allows it to be easily erected with little disturbance to the site upon which it is to be used. It will not interfere with other activities in its close vicinity, nor does it compete for space with other equipment. This is an important consideration in medical or industrial photography.

6. Unaffected by Weather Conditions

Even quite severe weather, producing precipitation or conditions causing temporary abandonment of a site will not disturb the modular support and it may remain erected in position ready to continue work when operations are resumed. It may also be abandoned on location for long periods and remains immune to insect attack and bacteriological decay. During gridding operations the modular support may be placed upon any side of the grid to avoid sun shadow falling across the subject area.

7. Accepts Multiple Light Sources

Electronic flash units and/or any type of continuous light sources may be attached to any point within the geometry of the modular support. This important feature provides the operator with the ability to increase illumination with multiple low cost units, or to create controlled directional lighting for use in low contrast conditions of day-light, illuminating shadow areas, or during night operations, and in any circumstance where no other source of illumination exists.

8. Can be Used Upon Any Slope

The highly variable geometry of the modular support allows it to be erected for use upon any gradient up to the vertical. The movement of the arms may be controlled by appropriate assembly without infringing upon the subject area.

9. Provides Stereo Parts

Normal separation is provided by 65 mm movement on the platform section (marked by luminous distance segments) and additional separation for distant subjects is available by use of the platform section slots and continuous scale marks. Two or more cameras may be mounted upon a section to record the subject upon different materials in mono or stereo form at the same time.

10. Uses Any Camera With Standard Lens

Simple or sophisticated cameras may be used with this modular support. Obviously, a camera with varied range of interchangeable lenses would greatly extend the system's use, and the quality of the optical equipment employed influences the final result. However, it is not necessary to use the more expensive cameras to exploit the very considerable capabilities of modular support.

11. Will Grid any Subject Area to Produce Close Range Mosaics

Assembling a grid base with additional sections providing the support and camera extension a site surface may be uniformly and accurately recorded. A measured and marked grid may be quickly photographed using the camera support and extension along.

12. Adjustable to Any Size of Grid

The maximum size of grid is dictated solely by the number of sections available for assembly.

13. Choice of Scale in Reproduction

Film plane to subject distances may be easily calculated and adjusted in close range work.

14. Standard Method of Use Produces Uniform Results

Consistently uniform recording over a period of time may be reliably carried out using this modular support. Operations of varied levels of skill and experience will record subject matter in a uniformly controlled manner. Pre-set alignment and automatic exposure control will produce light quality to a consistent degree with the minimum of distortion or variation between exposures.

15. Can Be Used For Close Range Recording

Subject matter of any size may be photographed in a controlled manner from a level or overhead position using normal horizontal extension and/or vertical support sections of modular support. Extreme close ups may be achieved, in any situation, with steady support for the slowest shutter speeds.

16. Low Capital Cost

Throughout the design process very careful consideration has been given to producing an easily manufactured product, which can be produced at low cost, without reducing quality in materials or designed capability.

17. Advanced Composite Construction

A strong, lightweight and rigid material is used for the multi-function sections with the ability to withstand rough handling and provide dimensional stability under extreme conditions of environmental exposure.

18. Records Considerable Amount of Dimensional Information

The modular support provides a means of film plane or instrument alignment and distance measuring which will enable the operator to quickly, and inexpensively, record a great deal of useful dimensional information, and remove the major distortions produced by uncontrolled photographic recording. This quantitative information can be easily extracted from the exposed material by using simple pantographic methods, or even tracing. Scaled drawings of useful accuracy may be reproduced from material recorded using this modular support and cameras of modest cost. The process is not intended to reproduce the high cost 'micron' accuracy of photogrammetry and, therefore, does not require skilled operators using extensive 'Metric' cameras and plotting machines. However, the modular support may, if required, be used as a support system for metric cameras and thus considerably extend the application of 'close range' photogrammetry for precise recording in situation were it would be normally impossible to operate 19. Can Be Used in Horizontal or Vertical Planes Each geometry assembly of the modular support revolves into horizontal or vertical planes and may be reduced or extended in combination for static or mobile operations.

20. Provides Targets For Recording Building Elevations

Sections may be locked together in any configuration and precisely levelled to form valuable alignment aids.

21. Can Be Suspended Upon Vertical Surfaces

The lightweight sections can be locked together and levelled to provide many combinations of vertical and horizontal forms. Their low weight and flat section is relatively easy to support by clamps or hooks through the full length slots.

22. Fitted With Angle Locks

The concept of a constant right angle geometry in the system provides control of alignment and levels from any position. Thus, the operator may check levels and alignment, in both planes, from a remote position. Distances from the film plane to the subject plane may be calculated from measured units on the sections.

23. Complete Modular Support Fits Into a Small Container

A waterproof and light container with a plastic foam interior cut out to accept the modular support may be provided. It will float and withstand rough handling during transportation and field operations.

24. Underwater Capability

The modular support system may be easily assembled underwater, or lowered into position for operation from the surface. Divers will find the sections easy to handle, and the locking method is simple to operate even with gloved hands. The sliding support and extension sections will remain free running even when contaminated by mud or sand, and are easily cleaned or hosed after use. The modular support system provides spikes, clamps or extension base supports, and the modular system may also be operated hand held for extension into normally inacessible areas. The modular support system may also be operated from the surface, using a motor drive housing, and extends to a considerable depth for underwater survey when divers are not available.

25. Clamps To Any Object

The multi-function sections may be attached to any ledge, bench, rock or tree branch, etc., by using the angle locks as rigid clamps. The sections may also be attached to movable objects or machinery, vehicles or aircraft.

26. Monopod

One or more sections, fitted with a spike or trench support, may be easily carried for hand operation as a monopod with considerable extension capability, or secured in position by spiking or clamping for operation from a remote position.

27. Method in Measured Units

All sections are marked in measured units, with luminous divisions for night use or conditions of low illumination.

28. Vertical Extension Range

The film plane or optical axis may be supported from two inches to twelve feet above ground level. Further extension may be obtained with additional section support geometry together with high speed emulsions and electronic flash.

29. Interchangeable Parts

The multi-function sections are all identical in design to provide the essential flexibility in arranging the geometry of the modular support system to suit any situation. Angle brackets not only connect sections, but also act as supports and clamps when required.

30. Variable Extension Geometry

The camera may be extended horizontally a considerable distance from the operator, and may even be placed around corners, or under and over objects at a distance. Level, and also alignment control is available, together with distance information. The castors supplied to fit all the section slots, at any point, will also provide mobility.

31. Variable Base Geometry

Two or more sections may be connected to create several different configurations to suit any situation. A copy stand may be erected for vertical or horizontal use, adding sections provides almost unlimited other permutations to meet any requirements.

32. No Springs, Pulleys or Wires

The modular support system does not contain any complicated devices which may easily fail, or useless decorative trimmings, and no waste material of any kind. The modular support system has been designed to provide simplicity of construction and operation with great reliability under arduous conditions.

33. Multiple Camera Capability

Two or more cameras may be attached at any points in the geometry of the modular support system.

34. Bench Operation

A section may be set up horizontally upon a bench to provide a base for the camera and subject between which the distance and alignment may be easily controlled and measured.

35. Pad, Spike or Castor Base Supports

Floor pads and ground spikes are provided to fit all the section slots at any point in the modular support system, and castors may also be fitted to provide mobility.

36. Mobile Base

Base sections fitted with castors provide movement for separation, tracking and positioning on or from a known base line with film plane control.

37. Controlled Horizontal and Vertical Capability

Precisely aligned montages may be created by controlled section positioning and rotating.

38. User Friendly

A serious worker may operate the modular support system in unusual configuration, and even employ it as a portable optical bench, but it is also very "user friendly" in that a novice will find it simple to use in any circumstances.

With the modular support system of this invention, the cameras, instruments and light units mount at any point in the system with predictable optical axis and film plane positioning. Level and alignment monitoring, in both planes may be carried out from a remote point.

The modular support system may be used with the ancillary components described above, including (a) floor pads (b) spikes (c) castors (d) clamps and (e) couplings. The modular support system of this invention may be used with a variety of accessories including but not limited to the following: (1) alignment aid; (2) protective cover; (3) direction indicator base; (4) underwater housing; (5) reflector and backing rolls; (6) filter and diffusing screens; (7) light tent; and (8) ball joint platform.

Thus, the modular support system may be used for photographing building elevations, entablatures, structural details, building details, inaccessible areas, e.g. mines and tunnels, and sea beds. It can be hand held for high extension use. It can be used for bird block recording, for gridding a surface for tomb wall and ceiling recording as a scaling frame and portable grid. It may also be used in hostile environments, e.g. nuclear engineering for providing positioning for remote operations in hazardous situations.

To recapitulate, it may be said that the modular support system of this invention has the following (non-limiting) fields of application: civil engineering; industrial engineering; consultant engineers; architecture; archaelogy; zoology; botany; geology; mining; military; photogrammetry; police; security; land survey; medical photography; research laboratories; commercial studios; art galleries; museums; and nuclear engineering.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A modular support system comprising:
   (a) an elongated bar, having a longitudinally extending slot traversing substantially the entire length thereof, except at its ends;
   (b) a clamping member securable to said elongated bar, said clamping member comprising a pair of complementary, essentially U-shaped components, with the space between the arms of the "U" being substantially the same as the width of said elongated bar, a central ridge between the arms of the "U" and adapted to enter the slot in the elongated bar, and means for providing secure engagement of the two "U"-shaped members through the ridges thereof; and
   (c) an angular member provided with at least one longitudinally extending slot in an arm thereof, for detachable securement at any desired location of the elongated bar;
   whereby a camera may be supported and extended into its desired position.

2. The modular support member of claim 1 wherein said clamping member includes a pair of pins, at least one being secured to at least one said ridge, and cooperating apertures in the clamp for engagment with said pins to prevent relative rotation between said complementary clamping components.

3. The angular support member of claim 2 wherein said pins and said apertures are on or in said ridges.

4. The angular support member of claim 2 wherein only the pins are on said ridges.

5. The angular support member of claim 2 wherein only the apertures are in said ridges.

6. The angular support member of claim 1 wherein the secure engagement of said complementary components is by a threaded engagement.

7. The angular support member of claim 1 wherein said angular member includes at least two arms, and wherein each arm is provided with a longitudinally extending slot therein.

8. A modular support system comprising:
   (a) at least two elongated bars, each having a longitudinally extending slot traversing substantially the entire length thereof except at its ends;
   (b) a clamping member for clamping two such elongated bars together, said clamping member comprising a pair of complementary, essentially U-shaped clamping components, with the space between the arms of the "U" being substantially the same as the width of the elongated bar, a central longitudinal ridge between the arms of the "U", adapted to enter the slot in the elongated bar, and means for providing secure engagement of the two U-shaped clamping components;
   and (c) an angular member, provided with at least one longitudinally extending slot in an arm thereof, for detachable securement at any desired location of said inter-connected elongated bars.

9. The modular support system of claim 8 wherein said clamping member includes a pair of pins, at least one secured to at least one said ridge, and cooperating apertures in the clamp for engagement with said pins to prevent relative rotation between said complementary clamping components.

10. The modular support member of claim 9 wherein said pins are temporarily but firmly and easily removably associated with said ridge.

11. The angular support member of claim 9 wherein said pins and said apertures are on or in said ridges.

12. The angular support member of claim 9 wherein only the pins are on said ridges.

13. The angular support member of claim 9 wherein only the apertures are in said ridges.

14. The angular support member of claim 8 wherein the secure engagement of said complementary components is by a threaded engagement.

15. The angular support member of claim 8 wherein said angular member includes at least two arms, and wherein each arm is provided with a longitudinally extending slot.

16. The modular support system of claim 14 wherein said threaded engagement means comprises a bolt threaded through the top and ridge of one said U-shaped member and provided with a central knob at the outer end thereof, adapted to engage a tapped aperture in the opposite ridge.

17. The modular support system of claim 8 wherein two said elongated bars are secured at about 180° to each other.

18. The modular support system of claim 8 wherein two said elongated bars are secured at about 90° to each other.

19. The modular support system of claim 17 including at least one additional elongated bar secured thereto.

20. The modular support system of claim 1 wherein said angular member includes a foot spike attached thereto, thereby to provide anchoring at the base of the support.

21. The modular support of claim 1 wherein said angular member is a right angled bracket.

22. The modular support system of claim 1 wherein said angular member is a member having two arms twisted with respect to each other.

23. The modular support system of claim 1 wherein said angular member is a member having two arms twisted with respect to each other at about 90° thereto.

24. The modular support system of claim 1 wherein said angular member includes three arms disposed at angular orientations thereof.

25. The modular support system of claim 1 wherein said angular member includes three arms disposed at angular orientations thereto said angular orientation being 120° between each arm.

26. The modular support system of claim 1 wherein said angular member includes a castor attached thereto, thereby to provide controlled mobility thereto.

27. The modular support system of claim 1 wherein said angular member includes a castor attached thereto in the form of a wheel rotatably mounted on an axle, thereby to provide controlled mobility thereto.

28. The modular support system of claim 1 wherein said angular member includes a castor attached thereto in the form of a cylinder rotatably mounted on an axle, thereby to provide controlled mobility thereto.

29. The modular support system of claim 1 wherein said angular member includes a castor attached thereto in the form of a Sheppard castor, thereby to provide controlled mobility thereto.

* * * * *